United States Patent [19]

Blossfeldt

[11] 4,355,308
[45] Oct. 19, 1982

[54] CIRCUIT ARRANGEMENT FOR OPERATING OPTO-ELECTRONIC DISPLAY ELEMENTS ASSIGNED TO TERMINAL DEVICES, IN PARTICULAR IN TELEPHONE SYSTEM

[75] Inventor: Dieter Blossfeldt, Munich, Fed. Rep. of Germany

[73] Assignee: Siemens Aktiengesellschaft, Berlin & Munich, Fed. Rep. of Germany

[21] Appl. No.: 239,042

[22] Filed: Feb. 27, 1981

[30] Foreign Application Priority Data

Apr. 17, 1980 [DE] Fed. Rep. of Germany ....... 3014845

[51] Int. Cl.³ .............................................. G09G 3/32
[52] U.S. Cl. .................................... 340/781; 340/782; 340/813
[58] Field of Search ...................... 340/781, 782, 813

[56] References Cited

U.S. PATENT DOCUMENTS 4,198,629 4/1980 Marion ............................ 340/782 X

FOREIGN PATENT DOCUMENTS 54-134597 10/1979 Japan ................................ 340/782

Primary Examiner—David L. Trafton
Attorney, Agent, or Firm—Hill, Van Santen, Steadman, Chiara & Simpson

[57] ABSTRACT

For displaying switching states and/or operating states, control switch-luminescent diode combinations are connected at intersections of row drive lines and column drive lines so that application of appropriate potentials to the drive line cause selective energization of the luminescent diodes. A plurality of controllable semiconductor switches are connected to be driven by the column drive lines and are connected to shunt those control switch-luminescent diode combinations which are not to be activated. A current limiting circuit is connected between the luminescent diodes and a supply voltage and is operable from a low ohmic state to a high ohmic state in response to switch-through of all of the controllable semiconductor switches.

7 Claims, 1 Drawing Figure

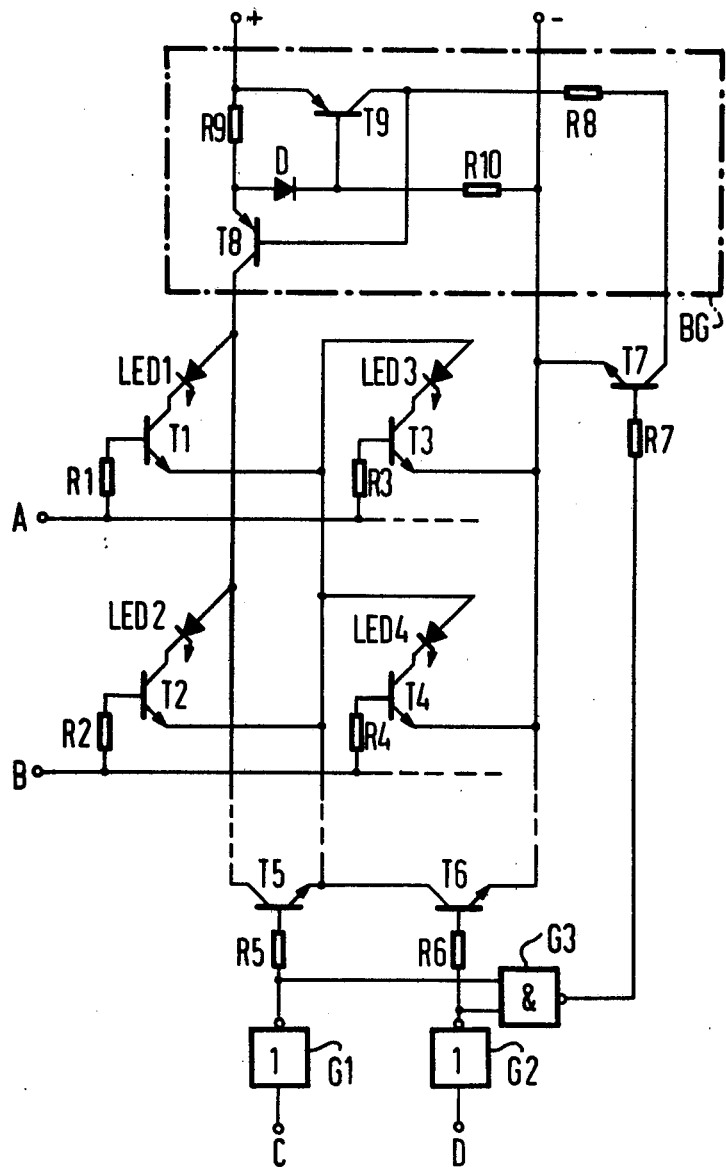

CIRCUIT ARRANGEMENT FOR OPERATING OPTO-ELECTRONIC DISPLAY ELEMENTS ASSIGNED TO TERMINAL DEVICES, IN PARTICULAR IN TELEPHONE SYSTEM

BACKGROUND OF THE INVENTION

1. Field of the Invention

The present invention relates to a circuit arrangement for operating a plurality of opto-electronic display elements, e.g. luminescent diodes, in particular those which are used in terminal devices of telephone systems for the optical display of switching states and/or operating states, where the display elements form part of a matrix arrangement and can be activated individually or in groups by the connection of items of control information to the particular drive lines.

2. Description of the Prior Art

Specific operating states are displayed by opto-electronic display elements, primarily in the form of so-called luminescent diodes or light emitting diodes, in various ways. As an example of use in telephone systems, reference may be made to use in subscriber stations in which a switching operation can be directly effected by operating different keys. These keys are assigned optical display elements in the form of luminescent diodes. By an appropriate operation of the luminescent diodes, specific operating states or seizure state of the system in question, or the subscriber stations within this system, can be signaled by different luminescent states. If at least one group of these luminescent diodes is arranged in a matrix, they are actuated by the connection of control signals to a specific member of a plurality of column and row lines, which connected is effected by a corresponding control unit. Each of these lines can be assigned an electronic semiconductor switch, e.g. a transistor serving as a control switch which is switched through by the aforementioned items of control information. The operation of the individual luminescent diodes by column lines and row lines within the matrix arrangement can be effected in a multiplex operation. In the drive circuit, this saves storage elements storing the particular required switching state of each luminescent diode.

In uses in which additional electronic components are provided in addition to the aforementioned matrix arrangement, generally only a single voltage source is available which is adapted in respect of its volage value to the supply voltage of these units. Generally, a lower supply voltage is required as a supply voltage for the opto-electronic display elements, e.g. luminescent diodes. In order to be able to use the aforementioned voltage source as an operating voltage, an appropriately dimensioned series resistor is provided. A series resistor of this kind is already required, however, to compensate the tolerances in the current flow resistance of the opto-electronic display elements. A current limiting measure of this kind serves to avoid the harmful influence of a high peak current, determined by the tolerances in the current flow resistor for the particular activated display element. When these display elements are arranged in a matrix, thus a series resistor of this kind should be provided at least for one type of drive lines, e.g. column lines. This series resistor is arranged, for example, in the main current path of the controllable semiconductor switch assigned as a control switch to each such line.

The power loss which occurs across the aforementioned series resistors can provide disturbing in those cases in which the aforementioned opto-electronic display elements are used in devices whose overall feed power is transmitted by way of corresponding feed lines which, depending upon the location of use, differ in line length. This would be the case, for example, when the display elements are arranged in the subscriber stations of a special type of telephone system. It is necessary to keep the overall current requirement of such a terminal device as low as possible. In establishing the voltage value for a central feed voltage source which supplies the feed power for the modules contained in a terminal device of this type, it is necessary to take into account the voltage drop which occurs in the event of a predetermined overall current consumption for the maximum line length. When the terminal device is connected to an extremely short line, a large current requirement of this kind would result in a correspondingly large and, thus, an extremely disadvantageous heat loss.

SUMMARY OF THE INVENTION

The object of the invention is to provide, for an opto-electronic display elements in association with their supply voltage, an arrangement which can be operated in the same manner as the matrix arrangement referred to above, by way of terminal points corresponding to the row lines and column lines, and which permits a reduction in the required current consumption.

The above object is achieved in an arrangement of the type generally referred to above in that those optical display elements which can each be actuted by an individually assigned control switch via the same drive lines assigned to one type of matrix lines (e.g. row lines), form a series circuit which is connected to the supply voltage with an interposed current limiting arrangement, and that each combination, in each case comprising the control switch and the opto-electronic display element, of each series circuit can be directly bridged by a controllable semiconductor switch whose drive terminal corresponds to the drive lines assigned to the other type of matrix lines (e.g. column lines), that in the presence of an item of drive information which results in the switch-through of all of the semiconductor switches a control signal is formed which automatically renders the current limiting arrangement highly ohmic.

Therefore, in order to reduce the current consumption at least two opto-electronic display elements can be connected in series with a corresponding voltage supply. The particular display element which is to be activated is selected by the same operating principle as in the case of the matrix arrangement referred to above. Therefore, when the drive unit is used, an exchange is easily possible. In the case of a drive system operating in accordance with the multiplex principle, only one control switch is required for each combination of all the series circuits which facilitates its bridging. Those display units of each series circuit which are not to be activated are effectively bridged by the control switch arranged parallel to its main current path. The drive signals for this purpose are connected to the control terminals in question by the control unit. If the control switches, which themselves are arranged in series, are rendered highly ohmic, all the display elements contained in the series circuit can be actuated. In accordance with the invention, in those case in which an item of drive information is present on the corresponding drive lines via the drive logic, which information facilitates a simultaneous switch-through of the latter to the semiconductor switch which effects the bridging, a current limiting device contained in the supply voltage line is switched highly ohmic. As a result, only a virtually negligible current flows across the semiconductor switches in question. The interposition of a current limiting device serves to reduce the power loss. The series resistors are thus eliminated.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a schematic circuit diagram of an arrangement constructed in accordance with the present invention.

DESCRIPTION OF THE PREFERRED EMBODIMENTS

By way of example, the drawing contains four optoelectronic display elements in the form of the luminescent diodes LED1–LED4. The luminescent diodes are activated, either individually or in groups, in an arbitrary combination by corresponding drive signals which are connected by a control unit (not shown) to the terminal points A, B and C, D. The terminal points A and B correspond to the points of the row lines, and the terminal points C and D correspond to those of the column lines of a normal matrix arrangement. Only two row lines and two column lines have been shown. The arrangement can naturally be extended both in respect of the number of row lines and in respect of the number of column lines. The luminescent diodes contained in a matrix arrangement in the illustrated manner can be arranged, for example, in a subscriber station which serves as a terminal device in a telephone system where it can serve, for example, to display the operating states and seizure states of other subscriber stations. The terminal points which correspond to a normal matrix, in the example A–D, can be operated by a control unit arranged in the subscriber station. This control unit can possibly exchange information with a central control arrangement.

In the described example, the illustrated unit would then be fed via corresponding feed lines from a central feed voltage source. Under certain circumstances, in each subscriber station a regulating unit can be initially connected to the corresponding feed line. This would then emit the supply voltage for all the units which for the main part consist of electronic components and modules. In the exemplary embodiment, it has been assumed that a regulating unit of this kind makes available a corresponding voltage at those terminal points provided with the plus (+) and minus (−) signs. This voltage could possess, for example, a voltage value of 6 V normally required for supplying electronic components and modules.

Under the assumption that the voltage drop across a luminescent diode LED in the switched-through state, i.e. in its luminescent state, amounts to approximately 3 V, to such luminescent diodes could be arranged in a series circuit. The number of these series circuits can go beyond the two represented on the drawing. The general possibility of extension is indicated by connecting lines which are partially broken. In the event of an appropriate voltage supply, more than two luminescent diodes can be contained in the series arrangement in question.

Each luminescent diode LED1–LED4 is connected in series with a control switch in the form of a respective transistor T1–T4. The control switches which are assigned to a row line, thus the control switches T1 and T3 for the row line A, can be operated by a corresponding drive signal at the terminal point A by way of a base resistor R1, R3. The same applies to the control switches T2 and T4 which are connected to the other row line B via the base resistor R2, R4 in question. By connecting a drive signal, which, for example, corresponds to a logic potential "1", to these terminal points, the luminescent diodes LED1, LED3 and LED2, LED4 could thus be actuated. Therefore, each existing series circuit comprises the series arrangement of two subcombinations. Each of these subcombinations is itself formed from the series arrangement of a luminescent diode and the main current path of a transistor which serves as a control switch. Each of these subcombinations can be bridged by a controllable semiconductor switch in the form of a transistor T5 or T6. This bridging is effected whenever the luminescent diode which is to be assigned is to remain inactive. If, for example, of the luminescent diodes LED1 and LED3 arranged in series, only the luminescent diode LED3 is to be brought into the luminescent state by an appropriate drive signal at the terminal point A, the transistor T5 is rendered conductive so that the subcombination formed from the luminescent diode LED1 and the transistor T1 is bridged. This applies in the same manner to the particular other subcombinations. The transistors T5 and T6, which in the enabled state facilitate these bridgings, are rendered operative by appropriate drive signals at the terminal points C and D. The drive circuit for each of these transistors contains, in addition to the base resistor R5, R6, an inverter G1 and G2, respectively. If a drive potential corresponding to the logic potential "1" is present at the terminal points C and D, the transistors T5 and T6 are blocked. This means that in such a case the particular subcombination is not bridged and thus the luminescent diode in question is brought into the luminescent state in dependence upon a drive potential which prevails at the terminal points A and B and which likewise correspond to the logic potential "1". Therefore, the individual luminescent diodes can be operated via the terminal points A–D in the same manner as those diodes which are contained in a matrix arrangement of the type originally referred to above. Therefore, the luminescent diodes which are to be connected in different combinations are based on the same operating table. The corresponding drive signals are connected to the individual terminal points in multiplex operation. In the case of a multiplex operation, single transistor can be provided for bridging purposes for those subcombinations which are assigned to a terminal point within the matrix arrangement which corresponds to a column line.

Both of the series circuits which contain the luminescent diodes and also the series circuit of the transistor used for bridging purposes are connected to the supply voltage parallel to one another via a current limiting arrangement BG. Within this arrangement, the main current arm contains not only a resistor R9, but also a series resistor T8. The resistance value of the resistor R9 is extremely low and can amount, for example, to up to 3 ohms. The series transistor is itself influenced by an auxiliary transistor T9 in a known manner. The auxiliary transistor is itself controlled by a diode D, which is operated in the forward direction, in response to its drop in voltage. In combination with a resistor R10, the diode D forms a shunt connection between the poles of the supply voltage.

In a normal operating situation, there is virtually no voltage drop in the series arm of the limiting arrangement. The limiting operation does not begin until a specific value of load current is achieved. This avoids current peaks for the luminescent diodes which impair their life. These current peaks can occur as, due to component tolerances, the luminescent diodes can differ considerably from one another in the terms of the value of their current flow resistance.

The series resistors, which for this reason are provided in the matrix arrangement initially mentioned, can therefore be omitted in the arrangement illustrated on the drawing. As a result, a reduction in the power loss is achieved.

The series transistor T8 of the current limiting arrangement BG is additionally influenced across its base by a transistor T7 via a resistor R8. This control transistor T7 is controlled via a base resistor T7 by the output signals of a NAND switching element G3. This switching element is connected at its input to the outputs of the inverters G1 and G2. This ensures that in those cases in which a drive potential corresponding to the logic potential "0" is simultaneously present at the terminal points C and D, the current limiting arrangement BG is switched highly ohmic. Although the transistors T5 and T6 are switched through when the aforementioned control potentials are applied, this results in only a slight current consumption, as in such a case the arrangement BG represents a high resistance located in the circuit via the correspondingly-controlled series transistor T8. This switching of the current limiting arrangement BG into a highly ohmic state is automatically achieved in the operating situation in question by the transistor T7 which is thus brought into the blocked state. In the blocked state, the transistor T7 intervenes into the existing regulating circuit in such a manner that during its block state the supply of enabling potential to the transistor T8 is suppressed.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for selectively operating a plurality of opto-electronic display elements, comprising:
    a plurality of row drive lines and a plurality of column drive lines each adapted to receive control signals of first and second values;
    a supply voltage;
    a plurality of opto-electronic display elements arranged in rows and columns and a plurality of control switches each connected to control conduction of a respective opto-electronic display element, said control switches distributed to and connected to said row drive lines and said opto-electronic display devices connected to said supply voltage;
    a plurality of controllable semiconductor switches each connected to a respective column drive line and connected in parallel across a respective column of said opto-electronic display devices;
    a current limiting circuit connecting said opto-electronic display elements to the supply voltage and operable in a low ohmic state and a high ohmic state;
    said control switches operable to switch the respective opto-electronic display elements conductive in response to a first value control signal on the respective row drive line and said controllable semiconductor switches operable to shunt the respective column of opto-electronic display devices in response to a first value control signal on the respective column drive line; and
    current control switching means connected to each of said column drive lines and to said current limiting circuit and operable to switch the same into its high ohmic state in response to the second value control signals on all of said column drive lines.

2. The circuit arrangement of claim 1, wherein:
   said opto-electronic display devices are luminescent diodes.

3. The circuit arrangement of claim 1, wherein:
   said control switches are transistors each including a base connected to a row drive line and a collector-emitter circuit connected in series with a respective opto-electronic display device.

4. The circuit arrangement of claim 1, wherein:
   said controllable semiconductor switches are transistors each including a base coupled to a respective column drive line and a collector-emitter circuit connected across all the control switch opto-electronic display device combinations of the respective column.

5. The circuit arrangement of claim 1, wherein:
   said current control switching means comprises:
   a plurality of inverters each interposed between a respective column drive line and the respective controllable semiconductor switch;
   a NAND gate including an output and a plurality of inputs, each of said inputs connected to a respective inverter; and
   a drive transistor connected between said output of said NAND gate and said current limiting circuit.

6. The circuit arrangement of claim 1, wherein said current limiting circuit comprises:
   first, second and third resistors, said first resistor connected to one pole of the supply voltage;
   a diode connected to said first resistor and connected in series with said second resistor to the other pole of the voltage supply; and
   first and second transistors each including a base, a collector and an emitter, said base of said first transistor connected to said collector of said second transistor and to said third resistor, said emitter of said first transistor connected to said first resistor and to said diode, said collector of said first transistor connected to said opto-electronic display devices of a row and to the respective controllable semiconductor switch, said base of said second transistor connected to the junction of said diode and said second resistor, said emitter of said second transistor connected to one pole of the supply voltage, and said third resistor connected to said current control switching means.

7. A circuit arrangement for selectively operating a plurality of opto-electronic display elements, comprising:

a plurality of row drive lines and a plurality of column drive lines each adapted to receive control signals of first and second values;

a supply voltage;

a plurality of opto-electronic display elements arranged in rows and columns and a plurality of control switches each connected to control conduction of a respective opto-electronic display element, said control switches distributed to and connected to said row drive lines and said opto-electronic display devices connected to said supply voltage;

a plurality of controllable semiconductor switches each connected to a respective column drive line and connected in parallel across a respective column of said opto-electronic display devices;

a current limiting circuit connecting said opto-electronic display elements to the supply voltage and operable in a low ohmic state and a high ohmic state;

said control switches operable to switch the respective opto-electronic display elements conductive in response to a first value control signal on the respective row drive line and said controllable semiconductor switches operable to shunt the respective column of opto-electronic display devices in response to a first value control signal on the respective column drive line;

current control logic switching means connected to said column drive lines and to said current limiting circuit and operable to switch said current limiting circuit into its high ohmic state in response to the second value control signals on a predetermined number of column drive lines.

* * * * *